Dec. 25, 1923.  
S. J. TELLER  
1,478,685  
MEANS FOR AND METHOD OF SHAPING BLANKS  
Filed May 3, 1921

Inventor  
S. Jay Teller  
By Wayne B Wells  
Attorney

Patented Dec. 25, 1923.

1,478,685

UNITED STATES PATENT OFFICE.

SPENCER JAY TELLER, OF HARTFORD, CONNECTICUT, ASSIGNOR TO PRATT & WHITNEY COMPANY, OF NEW YORK, N. Y., A CORPORATION OF NEW JERSEY.

MEANS FOR AND METHOD OF SHAPING BLANKS.

Application filed May 3, 1921. Serial No. 466,579.

*To all whom it may concern:*

Be it known that I, SPENCER JAY TELLER, a citizen of the United States, residing at Hartford, in the county of Hartford and State of Connecticut, have invented certain new and useful Improvements in Means for and Methods of Shaping Blanks, of which the following is a specification.

My invention relates to means for and methods of turning blanks in a lathe or other machine tool and particularly to means for and methods of forming a piece of work by means of a formed milling cutter.

One object of my invention is to provide means for or a method of forming a piece of work that shall effect a roughing operation on the work in a simple and in an efficient manner and that shall effect a finishing shearing cut on the work in an improved manner.

Another object of my invention is to provide means for or a method of forming a finished piece of work from a rough blank by moving the work into engagement with a formed cutter, which is provided with helicoidal cutting faces adapted to cut the predetermined contour of the work and which is rotated at a relatively high speed as compared with the movement of the work, to effect a roughing operation, and by rotating the formed cutter at a relatively slow speed as compared with the movement of the work to effect a scraping shearing cut during the finishing operation.

A further object of my invention is to provide a method of forming a blank to any predetermined shape by rotating the blank, by providing a cutting tool having a number of helicoidal cutting faces, the outline of each cutting face being such that a predetermined contour is described on an axial plane when the tool is rotated on the axis of the helicoids, and by so moving the tool as to take successive cuts on the blank either by one of said helicoidal faces or by different helicoidal cutting faces.

In forming a piece of work in a lathe or other machine tool the roughing operation should be a relatively quick operation and reduce the work roughly to the finished form and the finishing operation should be so effected as to smoothly cut the work to the desired form.

In forming a piece of work according to my method, the work, which is to be shaped to a predetermined form, is preferably rotated and a milling cutter, which is provided with helicoidal cutting faces adapted to cut the predetermined form, is rotated in engagement with the work at a relatively high speed as compared with the rotation of the work. The speed ratio between the milling cutter and the piece of work is preferably maintained constant during such operation and the cutter is fed towards the work to effect a roughing cut to the desired depth. Finally the cutter is rotated at a relatively slow speed as compared to the rotation of the work to effect a scraping finishing cut. During the finishing operation preferably the speed of the cutter is lowered and the speed of the piece of work is increased as compared with the speed of such parts during the roughing operation. Moreover, the speed ratio between the cutter and the piece of work is preferably maintained constant during the finishing operation.

In the above described method it is apparent the blank or the piece of work is quickly reduced to a form roughly approximating the form of the finished article by means of the cutter rotating at a rapid rate. Moreover, a smooth finishing cutting operation is effected by the cutter when it is operated at a relatively slow speed as compared with the rotation of the work. The speed ratio between the cutter and the piece of work during the finishing operation should be such that one cutting face of the cutter may effect a finishing cutting operation across the piece of work.

It should also be noted that a blank may be shaped in accordance with my invention without the step of rotating the work at a relatively slow speed and the tool at a relatively high speed. Thus, the primary roughing step may be omitted under certain cases. The blank may be roughed and finished by rotating it at a relatively high speed as compared with the movement of the cutting tool. The cutting tool may be rotated either at such speed that the complete shaping of the blank is effected by one cutting face or the tool may be rotated at such speed that the complete shaping of the blank is effected by a number of cutting faces.

The cutting edge of each tooth of a milling cutter having helicoidal cutting faces is inclined with respect to direction of movement in order to effect a shearing cut. Such inclination of the cutting face improves the cutting action inasmuch as the tool is permitted to engage the work gradually with little or no shock. The slow rotation of the cutting face during the finishing operation effects a shearing scraping cut which forms the piece of work with a high finish. A cutter which may be used for effecting the roughing and the finishing operation is disclosed and claimed in the patent to Friederich Müller No. 1,348,307, dated August 3rd, 1920. My invention is broadly shown and claimed in my copending application, Serial 466,580, filed May 3, 1921.

Figure 1:
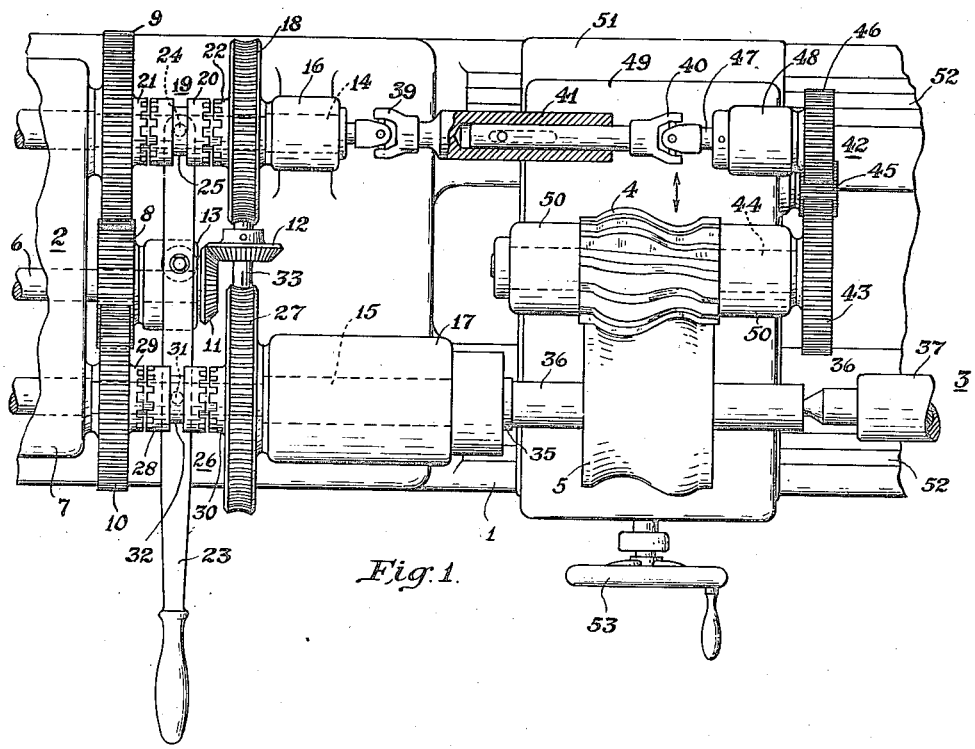
Figure 1 is a partial diagrammatic plan view of a machine tool adapted to form a blank in accordance with my method.
Figure 2:
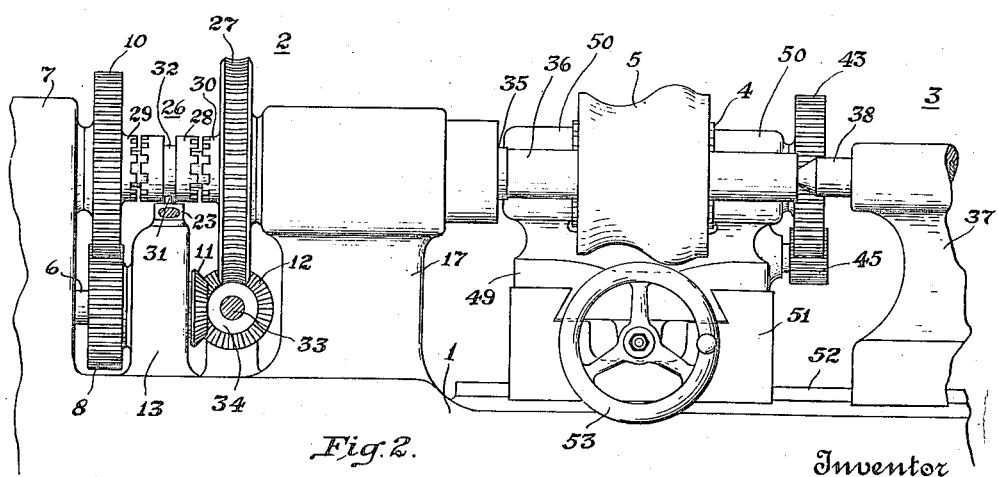
Fig. 2 is a partial side elevational view of the machine shown in Fig. 1.

Referring to the drawing, the machine tool, which has been utilized in describing my invention, comprises a bed 1 having a headstock 2 and a tailstock 3 mounted thereon. A formed milling cutter 4 and a blank 5 are mounted between the headstock 2 and the tailstock 3. The milling cutter and the blank are so rotated, in a manner to be hereinafter set forth, that the milling cutter rotates at a relatively high speed, as compared with the rotation of the blank, during the roughing cut. During the finishing cut, the blank 5 is rotated at a relatively high speed as compared with the rotation of the milling cutter 4. Although my invention is exemplified by means of a machine wherein the piece of work is rotated while in engagement with the milling cutter, it is apparent the piece of work may effect other movements when in engagement with the cutter.

The headstock 2 comprises a driving shaft 6 which is mounted in a headstock frame 7 and which is rotated in any suitable manner. The driving shaft 6 carries a spur gear wheel 8 which meshes with two adjacent spur gear wheels 9 and 10 and also carries a bevel gear wheel 11 which meshes with a bevel gear wheel 12. A bearing 13 is provided for supporting the shaft 6 between the spur gear wheel 8 and the bevel gear wheel 11. The gear wheels 9 and 10 are respectively rotatably mounted on shafts 14 and 15. The shaft 14 has a bearing in the frame 7 and a second bearing which is provided in a projecting portion 16 from the frame 1 of the machine. The shaft 15 is provided with a bearing in the frame 7 of the headstock and a second bearing in a projecting portion 17 from the frame 1 of the machine. The shaft 14 not only carries the gear wheel 9 but also carries a worm gear wheel 18 and a clutch mechanism 19. The worm gear wheel 18 is rotatably mounted upon the shaft 14 and is adapted to be connected to the shaft 14 by means of the clutch mechanism 19.

The clutch mechanism 19 comprises a central portion 20 which is slidably mounted on the shaft 14 but is adapted to rotate therewith and two cooperating portions 21 and 22 which are respectively mounted on the gear wheels 9 and 18. The central portion 20 is provided with any suitable teeth or projections which are adapted to mesh with similar teeth or projections formed on the portions 21 and 22. Thus when the central portion 20 of the clutch mechanism is moved towards the left as shown in the drawing, the gear wheel 9 is connected to the shaft 14. When the central portion 20 is moved towards the right, the worm gear wheel 18 is connected to the shaft 14. A hand-operated lever 23 is provided for moving the central portion of the clutch mechanism to connect the shaft 14 to either the gear wheel 9 or the worm gear wheel 18. The lever 23 is preferably pivotally mounted in any suitable manner upon the bearing 13 for the driving shaft 6 and carries a pin 24 which projects into a groove 25 formed in the central portion 20 of the clutch mechanism.

A second clutch mechanism 26 is provided for connecting either the gear wheel 10 or a worm gear wheel 27 to the shaft 15. The worm gear wheel 27 is rotatably mounted on the shaft 15. The clutch mechanism 26 comprises a central portion 28 which is slidably mounted on the shaft 15 but is adapted to rotate therewith. The central portion 28 is adapted to engage portions 29 and 30, which are respectively mounted on the gear wheels 10 and 27, for connecting either of the gear wheels to the shaft 15. The lever 23 is provided with a pin 31 which projects into a slot 32 formed in the central portion 28 of the clutch mechanism. Thus, when the lever 23 is moved in one direction, the clutch mechanism 19 connects the gear wheel 9 to the shaft 14 and the clutch mechanism 26 connects the worm gear wheel 27 to the shaft 15. When the lever 23 is moved in an opposite direction, the clutch mechanism 19 connects the worm gear wheel 18 to the shaft 14 and the clutch mechanism 26 connects the gear wheel 10 to the shaft 15. The spur gear wheels 9 and 10 are directly connected to the power shaft 6 by means of the spur gear wheel 8, as heretofore set forth, and the worm gear wheels 18 and 27 are connected to the shaft 6 by means of the bevel gear wheels 11 and 12. A worm shaft 33 which carries the bevel gear wheel 12 is provided with worm members 34 which respectively engage the two worm gear wheels 18 and 27. The worm shaft 33 is supported in any suitable manner upon the frame 1 of the machine. Any suitable means is provided for preventing axial movement either of the gear wheels 9 and 18 on the shaft 14 or of the gear wheels 10 and 27 on the shaft 15.

The shaft 15 carries a collet chuck 35 which is adapted to engage the arbor 36 which carries the blank 5 being formed. A tailstock frame 37 having a pin 38 mounted therein is provided for supporting the other end of the arbor 36. From the above description it is apparent the blank 5 may be rotated at a high or a low speed according to whether the gear wheel 10 or the worm gear wheel 27 serves to connect it to the driving shaft 6.

The shaft 14, which carries the gear wheels 9 and 18, is adapted to effect rotation of the milling cutter 4. Such shaft is connected to the milling cutter by means of two universal joints 39 and 40, a telescoping shaft 41 and a gearing system 42. The gearing system 42 comprises a gear wheel 43 which is mounted on a shaft 44, an idler gear wheel 45 and a gear wheel 46 which is mounted on a shaft 47. The shaft 47 is directly connected to the shaft 14 by means of the universal joints 39 and 40 and the telescoping shaft 41 and is supported in a bearing 48 that is mounted on a slide 49. The slide 49 also carries two bearings 50 which support the shaft 44 on which the milling cutter 4 and the gear wheel 43 are mounted. The idler gear wheel 45 is mounted on a stud shaft which projects from the side of the slide 49.

The slide 49 is mounted on a second slide 51 which is movable along the guideways 52 of the main frame 1. The slide 49 is moved transversely in any suitable manner as by means of a hand wheel 53. By such movement of the slide 49, the milling cutter 4 is moved transversely to the blank 5 for cutting the blank to the required depth. It will be noted the universal joints 39 and 40 and the telescoping shaft 41 permit the movement of the milling cutter 4 by the slide 49 without interfering with the connection of such milling cutter with the driving shaft 6. No means is shown in the drawing either for moving the slide 51 or the tailstock along the guideway 52 but it is to be understood that any well known means may be provided for moving such members.

Assuming the driving shaft 6 and the gear wheel 8 to be rotated in a counter-clockwise direction, the gear wheels 9 and 10 will be rotated in a clockwise direction. Moreover, the worm members 34 which are mounted on the shaft 33 are so constructed as to rotate the worm gear wheels 18 and 27 in a clockwise direction. Accordingly, the shaft 14 is rotated in a clockwise direction whether it is connected to the power shaft by the gear wheel 9 or the worm gear wheel 18. The milling cutter 4 is rotated in a clockwise direction by reason of the inter-position of the idler gear wheel 45 between the gear wheels 43 and 46. The blank 5 is rotated in a clockwise direction by reason of being directly connected either to the gear wheel 10 or the worm gear wheel 27.

In shaping or forming a blank in accordance with my method, the blank 5 is mounted between the headstock and tailstock as shown in the drawing and a formed milling cutter is mounted on the shaft 44 adjacent to the blank 5. The lever 23 is moved toward the right as shown in the drawing to connect the shaft 14 to the driving shaft 6 through the gear wheel 9 and to connect the shaft 15 to the driving shaft 6 through the worm gear wheel 27. The milling cutter 4 is rotated at a relatively high speed as compared with the rotation of the blank 5. Such rotation of the milling cutter 4 quickly roughs out the blank to the desired shape. The wheel 53 controls the transverse movement of the milling cutter to cut the blank to the required depth.

When the roughing operation is finished, the lever 23 is thrown to the left in order to connect the milling cutter and the shaft 14 through the worm gear wheel 18 to the driving shaft 6 and to connect the blank and the shaft 15 to the power shaft 6 through the gear wheel 10. In such position of the machine, the milling cutter 4 is rotated at a relatively slow speed as compared with the rotation of the blank 5. Preferably, the speeds are so adjusted that one tooth of the milling cutter may be able to make a scraping finishing touch on the blank. Inasmuch as the cutting edge of each tooth of the milling cutter is inclined with respect to the direction of movement, it is apparent a shearing cut is effected during such finishing operation which will produce a highly finished surface.

As heretofore set forth the roughing operation may be omitted, if so desired. In such case the blank is rotated at a relatively high speed with respect to the rotative movement of the tool. The tool may be so rotated that one cutting edge takes successive cuts on the blank during the rotation of the latter. Thus, one cutting edge cuts the blank to the desired shape. Moreover, if so desired, successive teeth on the blank may be brought into engagement with the blank during its rotation. Thus, in the latter case, the successive cuts on the blank are effected by the cutting faces of different teeth.

It will be understood that such changes and modifications may be made in my invention as fall within the limits of the appended claims.

What I claim is:

1. The method of cutting metal, which consists in rotating a blank, in providing a tool having a front cutting face inclined with respect to the axis of the blank, and in slowly moving the tool on an axis parallel to the blank axis and in timed relation to the blank rotation so that a different portion of the edge of the cutting face is in engagement with the blank at each successive rotation thereof.

2. The method of cutting metal, which consists in providing a tool having a helicoidal front cutting face, the outline of the cutting face being such that a predetermined contour is described on an axial plane when the tool is rotated on its helicoidal axis, in effecting repeated rotation of the work, the axis of the work being parallel to the axis of the helicoid of the tool, and in effecting a slow movement of rotation of the tool in timed relation to the blank rotation so that a different portion of the edge of the cutting face is in engagement with the work at each successive rotation thereof.

3. The method of cutting metal, which consists in providing a tool having a plurality of helicoidal cutting faces, the outline of each cutting face being such that a predetermined contour is described on an axial plane when the tool is rotated on the axis of the helicoids, in effecting relative movement between the work and the tool, and in so operating the cutting tool that the successive cutting faces take successive cuts on the work to shape it in accordance with the contour described by the cutting faces of the tool on an axial plane.

4. The method of cutting metal, which consists in providing a tool having a plurality of helicoidal cutting faces, the outline of each cutting face being such that a predetermined contour is described on an axial plane when the tool is rotated on the axis of the helicoids, in rotating a blank, and in so rotating the tool that successive helicoidal cutting faces take successive cuts on the rotating blank to shape it in accordance with the contour described by the cutting faces of the tool on an axial plane.

5. The method of shaping a piece of work to a predetermined form, which consists in providing a milling cutter with helicoidal cutting faces adapted to cut the predetermined form, in rotating the milling cutter at a relatively rapid rate in engagement with the work in movement to effect a roughing cut, and in rotating the cutter at a relatively slow rate in engagement with the work in movement so that one cutting face of the cutter effects a finishing cut across the piece of work.

6. The method of shaping a piece of work to a predetermined form, which consists in providing a milling cutter with helicoidal cutting faces adapted to cut the predetermined form, in rotating the cutter in engagement with the work while effecting independent relative motion between the cutter and the piece of work to rough out the work to a predetermined form, and in rotating the cutter at a slow rate while effecting independent relative motion between the cutter and the work so that one cutting face of the cutter effects a finishing cut across the work.

7. The method of shaping a piece of work, which consists in effecting relative rotation between a milling cutter and the piece of work to effect a roughing cut and in rotating the piece of work relatively to the cutter so that one cutting face on the cutter may effect a scraping finishing cut on the work.

8. The method of shaping a piece of work, which consists in rotating the piece of work at a relatively low speed and a cutter at a relatively high speed to effect a roughing cut, and in so effecting relative rotation between the work and the cutter that one cutting face of the cutter may effect a finishing cut on the work.

9. The method of shaping a piece of work, which consists in effecting relative rotation between the work to be operated on and a cutter having helicoidal cutting faces to effect a roughing cut, and in rotating the work at a relatively high speed and the cutter at a relatively low speed to effect a finishing cut.

10. The method of shaping a piece of work to a predetermined contour, which consist in roughly forming the work to the predetermined contour, in rotating the piece of work, in providing a cutter having helicoidal cutting faces adapted to cut the predetermined contour, and in rotating said cutter in engagement with the work and at a relatively low speed as compared with the rotation of the piece of work to effect a scraping finishing cut.

11. The method of shaping a piece of work, which consists in rotating the piece of work, in rotating a cutter at a relatively high speed, as compared with the rotation of the piece of work, to effect a roughing cut, and in rotating the cutter at a relatively low speed, as compared with the rotation of the piece of work, to effect a finishing cut.

12. The method of shaping a piece of work to a predetermined non-rectilinear contour, which consists in rotating the piece of work, in providing a cutter having helicoidal cutting faces adapted to cut the predetermined contour, in engagement with the work and at a relatively high speed as compared with the rotation of the piece of work to effect a roughing cut, and in rotating the cutter at a relatively low speed, as compared with the rotation of the work, to effect a finishing cut.

13. The method of shaping a piece of work, which consists in rotating the piece of work to be operated on, in providing a cutter having cutting edges inclined with respect to the cutter axis, in rotating said cutter in engagement with the work and at a relatively high speed as compared with the rotation of the piece of work, to effect a roughing cut, and in rotating the cutter at a relatively low speed, as compared to the rotation of the piece of work, to effect a finishing scraping cut on the piece of work.

14. The method of shaping a piece of work, which consists in providing the work to be operated on, in rotating a cutter having cutting edges inclined with respect to the cutter axis, in rotating said cutter in engagement with the work and at a relatively high speed as compared with the rotation of the piece of work to effect a roughing cut, and in rotating the cutter relatively to the and in rotating the work at such speed that one rotation of the work at such speed that one cutting face of the cutter may effect a finishing scraping cut on the work.

15. The method of shaping a piece of work to a predetermined non-rectilinear contour, which consists in rotating the work, in providing a cutter having helicoidal cutting faces adapted to cut the predetermined form, in rotating said cutter in engagement with the work and at a fixed higher speed as compared with the rotation of the work, in moving the cutter toward the work to effect a roughing cut to the required depth, and in changing the speed ratio between the cutter and the work so that the cutter rotates at a relatively slow speed as compared with the rotation of the work to effect a scraping finishing cut.

16. In a machine for cutting a piece of work to a predetermined form, the combination comprising a milling cutter provided with helicoidal cutting faces adapted to cut the predetermined form, means for rotatably mounting the cutter adjacent to the work, means for rotating the cutter at different speeds to effect roughing and finishing cuts, and means for effecting independent movement of the work while in engagement with the cutter.

17. In a machine for cutting a blank to a predetermined form, the combination comprising a milling cutter provided with helicoidal cutting faces adapted to cut the predetermined form, means for rotatably mounting the blank and the cutter adjacent to each other, and means for rotating the cutter at a rapid rate and the blank at a relatively slow rate to effect a roughing cut and for rotating the cutter at a slow rate and the blank a rapid rate to effect a finishing cut.

18. In a machine for cutting a piece of work to a predetermined form, the combination comprising a milling cutter provided with helicoidal cutting faces adapted to cut the predetermined form, means for rotatably mounting the cutter adjacent to the work so that relative movement may be effected between the cutter and the work to effect cuts of different depths, means for rotating the cutter at different speeds to effect roughing and finishing cuts, and means for effecting independent movement of the work while in engagement with the cutter.

19. In a machine for cutting a blank to a predetermined form, the combination comprising a milling cutter provided with helicoidal cutting faces adapted to cut the predetermined form, means for rotatably mounting the blank and the cutter in engagement with each other, and means for rotating the blank and cutter at one speed ratio to effect a roughing out and for rotating said members at a different speed ratio to effect a finishing cut.

20. In a machine for cutting a piece of work to a predetermined form, the combination with means for rotatably mounting the piece of work, and means comprising a slide for rotatably mounting the cutter adjacent to the work so that the cutter may be moved relatively to the work to effect cuts of different depths, of a power shaft, means comprising interlocked clutch mechanisms for connecting the cutter and work to the power shaft so that a predetermined speed ratio is effected during the roughing operation and for connecting such members to the power shaft so that a different speed ratio is effected during the finishing operation.

21. In a machine for cutting a piece of work to a predetermined form, the combination with means for rotatably mounting the piece of work, means comprising a slide for rotatably supporting the cutter adjacent to the work, and means for moving said slide to vary the position of the cutter relative to the work in accordance with the desired depth of cut, of a power shaft, two interlocked clutch mechanisms associated with the cutter and the piece of work for controlling the connection of such members to the power shaft and for controlling the speed ratio between the cutter and the work, and means comprising a telescoping shaft and universal connections for so connecting the cutter to the associated clutch mechanism as to permit the transmission of power to the cutter when said slide is being moved.

In testimony whereof, I hereto affix my signature.

S. JAY TELLER.

Certificate of Correction.

It is hereby certified that in Letters Patent No. 1,478,685, granted December 25, 1923, upon the application of Spencer Jay Teller, of Hartford, Connecticut, for an improvement in "Means for and Methods of Shaping Blanks," errors appear in the printed specification requiring correction as follows: Page 2, line 14, after the word "Serial" insert the abbreviation *No.;* page 4, line 99, claim 10, for the word "consist" read *consists;* same page, line 122, claim 12, after the word and comma "contour," insert the words *in rotating said cutter;* and that the said Letters Patent should be read with these corrections therein that the same may conform to the record of the case in the Patent Office.

Signed and sealed this 18th day of March, A. D., 1924.

[SEAL.]
KARL FENNING,
*Acting Commissioner of Patents.*